US006006807A

United States Patent [19]

Domes et al.

[11] Patent Number: 6,006,807

[45] Date of Patent: Dec. 28, 1999

[54] APPARATUS FOR FEEDING STRIPS COATED WITH A FUSION ADHESIVE ON ONE OF THEIR SURFACES TO A SHEET-STACK BINDING APPARATUS

[75] Inventors: Helmut Domes, Stuttgart; Olaf Kosanke, Darmstadt, both of Germany

[73] Assignee: Eastman Kodak Company, Rochester, N.Y.

[21] Appl. No.: 08/150,668

[22] Filed: Nov. 10, 1993

[30] Foreign Application Priority Data

Nov. 24, 1992 [DE] Germany ............................ 42 39 387

[51] Int. Cl.[6] ............................ B32B 35/00; B42B 5/04; B42B 9/00

[52] U.S. Cl. ......................... 156/521; 156/361; 156/538; 156/563; 412/36

[58] Field of Search .................................. 156/361, 517, 156/521, 545, 563, 564, 565, 538; 271/258, 268; 412/36

[56] References Cited

U.S. PATENT DOCUMENTS

| | | | |
|---|---|---|---|
| 4,123,310 | 10/1978 | Varon et al. | 156/361 X |
| 4,448,626 | 5/1984 | Off et al. | 156/521 X |
| 4,489,872 | 12/1984 | Bolton et al. | 226/117 |
| 4,703,926 | 11/1987 | Granot et al. | 271/268 X |
| 4,949,953 | 8/1990 | Claassen et al. | 271/268 X |
| 4,976,807 | 12/1990 | Irie et al. | 156/405.1 |
| 4,990,033 | 2/1991 | Handley et al. | 406/82 |
| 5,004,515 | 4/1991 | Nebashi et al. | 156/545 X |

FOREIGN PATENT DOCUMENTS

| | | | |
|---|---|---|---|
| 0 186 080 | 12/1985 | European Pat. Off. | C09J 7/02 |
| 0 320 056 | 12/1988 | European Pat. Off. | B42C 9/00 |
| 0 412 742 | 8/1990 | European Pat. Off. | B42C 9/00 |
| 21 44 101 | 3/1973 | Germany | B42C 9/02 |

*Primary Examiner*—Curtis Mayes
*Attorney, Agent, or Firm*—Lawrence P. Kessler

[57] ABSTRACT

Apparatus for feeding strips coated with a fusion adhesive on one of their surfaces to a sheet-stack binding apparatus, in particular, for the binding of loose sheets to form brochures or books, such apparatus enabling, in parallel with a binding operation, a strip cut to the required length to be made available for a subsequent binding operation. The apparatus (14) arranged in the strip path downstream of a cutting unit (12) includes a transport carriage (15) which is stationary with respect to the strip path (13) and movable vertically to the strip path and on which a horizontally movable element (16) as well as a plurality of stationary mechanical elements (11, 17) are arranged for holding the strip free from torsion. Driving means (19), control means, as well as a tilting device (18) are provided for transferring transport carriage (15) to a binding apparatus (21) which is arranged vertically to the strip path (13) and holds the sheet stack (22) such that the strip rests on the spine of the sheet stack in a centrally aligned position and is fixed by holding elements (23) of the binding apparatus (21).

6 Claims, 2 Drawing Sheets

11c
11
11a
11b 1a
1a'
1b
1b'
1c
1d
2a
2b
3a
3b
4a
4b
5
6
7'
7a
7b
7c
7d
8
9
10a
10b
10'
11
12
12'
13
14

APPARATUS FOR FEEDING STRIPS COATED WITH A FUSION ADHESIVE ON ONE OF THEIR SURFACES TO A SHEET-STACK BINDING APPARATUS

BACKGROUND OF THE INVENTION

This invention relates in general to an apparatus for binding loose sheets to form brochures or books, and in particular, to a device for feeding strips coated with a fusion adhesive on one of their surfaces to a sheet-stack binding apparatus.

Apparatus, for binding loose sheets to form brochures or books of the type using strips coated with a fusion adhesive, are described, for example, in DE-PS 2 144 101, as well as in the European Patents EP O 186 080 and EP O 412 742. A sheet stack held between clamping elements is pressed in the usual manner onto a fusion-adhesive coated strip which is arranged directly on or above a heated platen. As shown in EP O 186 080, an adhesive element cut to be adapted to the sheet format can also be pressed by means of a pressure device against the spine of the sheet stack from below and then heated. Using heated lateral pressure elements, the adhesive strip is then folded and pressed against the cover sheets. EP O 320 056 describes a device for binding a stack of loose sheets by strips having a fusion-adhesive coating, in which selectively activatable means are provided for removing the adhesive layer during a binding operation. In the case of these known apparatus, the strip is fed sequentially by one or several strip transport units from a supply station through a cutting unit to a binding apparatus. Such apparatus are disadvantageous in that the sheet-stack binding operation has to be completed before another strip can be fed for the subsequent binding operation of the binding apparatus.

SUMMARY OF THE INVENTION

It is an object of this invention to provide apparatus for feeding strips coated with a fusion adhesive on one of their surfaces to a sheet-stack binding apparatus which allows a strip cut to the required length to be made available for a subsequent binding operation while a preceding binding operation is being carried out so that the time needed for the total sheet-stack binding process can be considerably reduced. According to this invention, the object is attained in that a transport carriage is arranged in the strip path downstream of the cutting unit so as to be vertically movable with respect thereto, such carriage mounting a horizontally movable mechanical element as well as a plurality of stationary mechanical elements. In this manner a strip can be advantageously fed free from torsion and tautly tensioned by the cutting unit to the transport carriage by the mechanical elements mounted thereon. Driving and control means move the transport carriage to a binding apparatus which is arranged vertically with respect to the strip path and on which a sheet stack is held such that the strip rests against the spine of the sheet stack in a centrally aligned position and fixed by holding elements of the binding apparatus. Due to the advantageous arrangement of this apparatus relative to the sheet-stack binding apparatus, a fresh strip to be cut to the binding length required can be made available while a binding operation using a fusion-adhesive coated strip is still underway.

BRIEF DESCRIPTION OF THE DRAWINGS

The invention will be explained in further detail with reference to the figures wherein.

DETAILED DESCRIPTION OF THE INVENTION

Figures 1, 2:
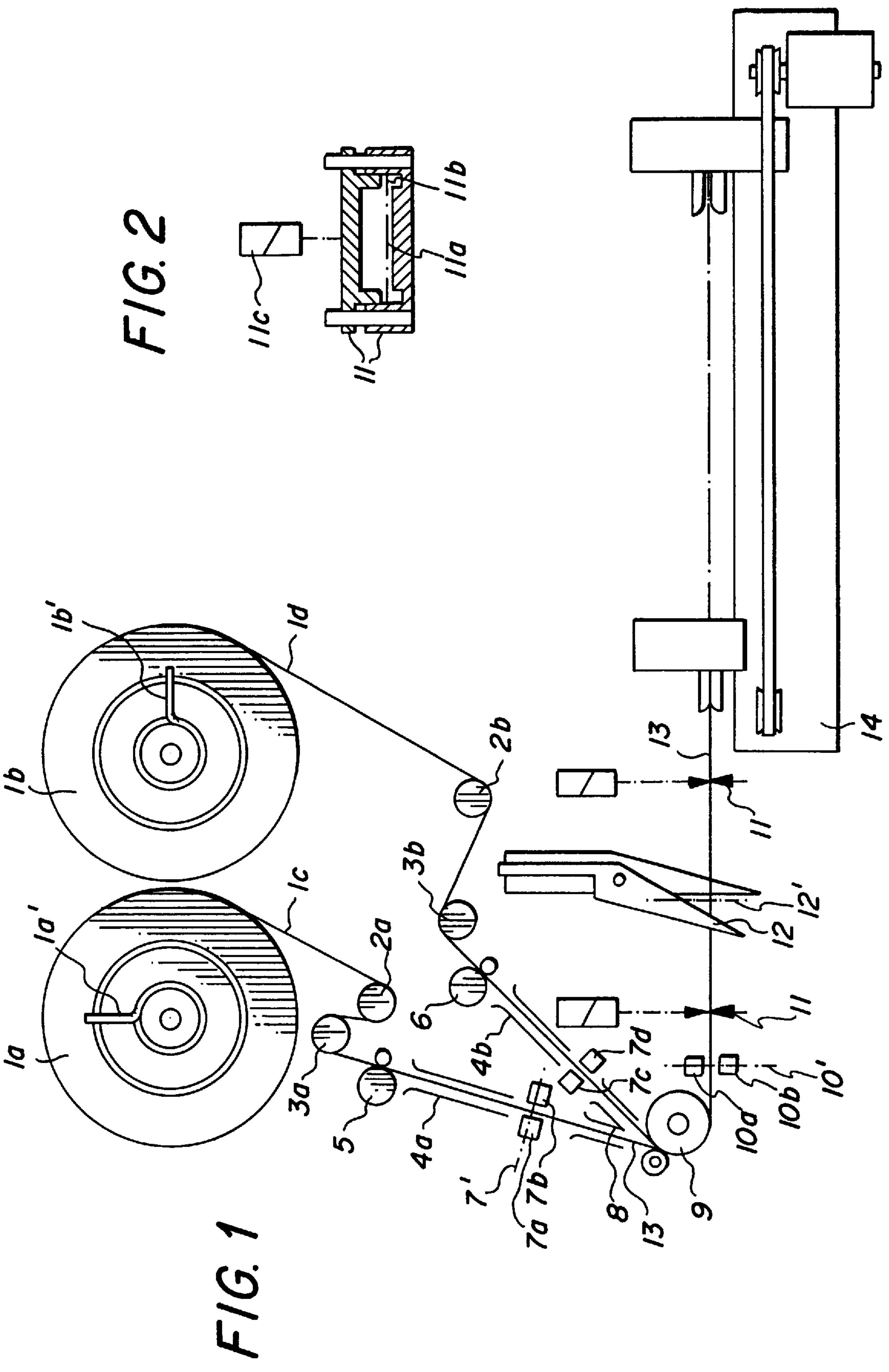
FIG. 1 is a schematic view showing the strip guide path up to the binding strip.
FIG. 2 is a sectional view of a strip guide element of the binding strip feeding apparatus according to FIG. 1.

As shown in FIG. 1, the binding strip feeding apparatus has two strip supply rolls, 1*a* and 1*b* respectively, which are provided with winding springs 1*a*' and 1*b*' and on which strips coated with a fusion adhesive on one of their surfaces and having different widths are tautly wound. For guiding the strips wound on the strip supply rolls 1*a* and 1*b* to a strip driving means 5 or 6 separately provided for each of these strips, deflecting rollers 2*a* and 3*a* and 2*b* and 3*b* respectively are arranged in the strip paths. The strip driving means 5 and 6 which are driven by direct-current motors comprise a driving and a pressure roller between which the strip concerned is guided and tautly tensioned by means of the winding springs of the strip supply rolls 1*a* and 1*b*, respectively. Guide paths 4*a* and 4*b*, each adapted to one of the strip widths, feature at their ends respective optical switch elements 7*a* and 7*b* and 7*c* and 7*d* which consist of light barriers. A threading element 8 connects the separate guide paths 4*a*, 4*b* such that they terminate in a common strip transport path 13 in which a chief strip driving means 9, another optical element 10*a* and 10*b* forming a light barrier, a switchable strip guide element 11, as well as a strip cutting unit 12 are sequentially arranged. The chief strip driving means 9 consists of a stepping motor which is connected to an electronic control means (not illustrated) in a manner similar to that of the direct-current motors 5 and 6.

As illustrated in FIG. 2, an element mounted to a magnet 11*c* and including two guide channels 11*a* and 11*b* at its lower side is arranged on the switchable strip guide element 11. By means of a signal which actuates one of the strip driving means 5 or 6, magnet 11*c* is switched such that a guide channel corresponding to a specific strip width can be moved into the strip path 13.

Figure 3:
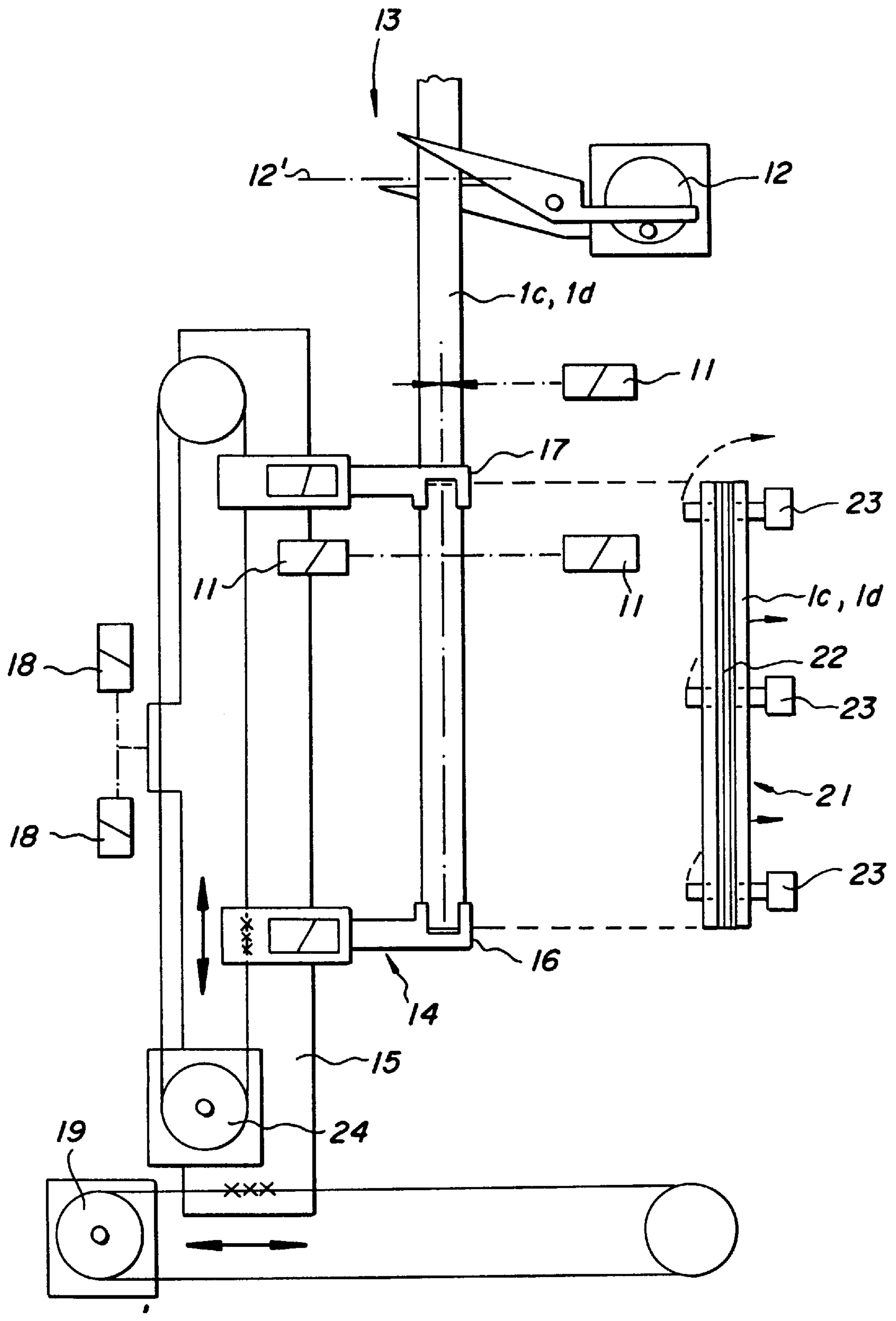
FIG. 3 is a schematic view of the binding strip feeding apparatus according to FIG. 1 together with a transport carriage and a sheet-stack binding apparatus.

As can be seen in FIG. 3, a further strip guide element 11 and a strip transport unit 14 having a transport carriage 15 are arranged downstream of cutting unit 12. The transport carriage mounts stationary elements 11 and 17, consisting of a strip hold-down element 17 and a strip guide element 11, as well as a movable element 16 which consists of a strip gripping and pulling element. The clamping portions of the elements 16 and 17 are shaped such that strips of different widths can be reliably held and transported. By such arrangement, the strips 1*c* or 1*d*, as noted above, can be fed substantially free of torsion to facilitate binding.

The strip gripping and pulling element 16 and the transport carriage 15 are connected with separately controllable stepping motors 19 and 24, with a slip clutch (not illustrated) being provided between the gripping and pulling element 16 and the stepping motor 24. A tilting device 18 consisting of lifting magnets, and provided on transport carriage 15, pivots carriage 15 as a whole in the vertical direction when it is positioned below binding apparatus 21. A sheet stack 22 is held on binding apparatus 21 by clamping elements 25 and 26. Binding apparatus 21 includes holding elements 23 for pressing the strip against sheet stack 22 after it has been transported below the stack by means of carriage 15.

Strip transport by means of the binding strip feeding apparatus is carried out as follows:

The thickness of the sheet stack 22 to be bound is determined by opto-electronic means, e.g., by light barriers arranged at a predefined distance from each other. A signal corresponding to the thickness value is transmitted to the central electronic unit which controls the device and wherein the widths of the strips 1*c* and 1*d* respectively wound on the strip supply rolls 1*a* and 1*b* are compared with the sheet-stack thickness sensed. The strip widths are each associated with a specific thickness range of the sheet stack to be bound. The thickness value of the sheet stack can also be provided in a simple manner in the central electronic unit.

When the device is in its initial condition, the leading edges of the individual strips 1*c* and 1*d* are located in the standby position 7' which is defined by light barriers 7*a* and 7*b* and 7*c* and 7*d* respectively arranged in the strip guide paths 4*a* and 4*b*. The result of the comparison of the strip width and the thickness value of the sheet stack causes one of the strip driving means 5 or 6, i.e., a direct current motor, to transport the corresponding strip 1*c* or 1*d*, which has the desired width, from the standby position 7' to the handling position 12' as defined by strip cutting unit 12. For this purpose, the corresponding strip, e.g., strip 1*c*, is shifted by means of motor 5 over the threading element 8 until the leading strip edge is engaged by stepping motor 9 and thereby transported into the handling position 12' as defined by strip cutting unit 12. When the leading strip edge has reached the position fixed by means of the light barriers 10*a* and 10*b*, the driving roller of direct current motor 5 is switched off by a magnet so that the strip is now transported by stepping motor 9 only. On the other hand, the controlling central electronic unit is caused to determine the path length of the strip by counting the steps of motor 9 up to the strip handling position 12' and to supply the corresponding value to an electronic storage means.

For cutting the strip to the length of the sheet stack 22 to be bound, the strip is transported by stepping motor 9 to the gripping and pulling element 16 which is positioned at the hold-down element 17 and subsequently transfers the strip synchronously with stepping motor 9 to a position which corresponds to the strip length as predetermined by the central electronic unit for the sheet stack to be bound. The strip length to be cut is determined by counting the further steps of motor 9, on the basis of the value of the strip length stored in the electronic storage means and the total strip length provided in the central electronic unit.

When the predetermined strip length has been reached the section where the strip is to be cut is situated below cutting unit 12. The strip is cut and by means of the gripping and pulling element 16 transported onto transport carriage 15 such that the strip is tautly tensioned between its trailing edge held in the hold-down element 17 and the leading edge held in the gripping and pulling element 16. In order to limit tensile stress, the gripping and pulling element 16 connected with stepping motor 24 includes a slip clutch (not illustrated).

Stepping motor 19, controlled by the central electronic unit, transports the transport carriage 15 with strip 1*c* to the binding apparatus 21 which is arranged vertically to the strip path 13 and in which at this point the holding elements 23 have been pivoted away from sheet stack 22 in the direction of the arrows shown in FIG. 3. When the strip 1*c* has been centrally aligned below sheet stack 22, transport carriage 15 is pivoted by means of tilting device 18 in the direction towards the sheet stack so that the strip is pressed against the spine of the sheet stack. The holding elements 23 pivot below strip 1*c* and press the strip against the spine of the sheet stack before further treatment occurs. The fusion adhesive coated strip is bonded in a manner known per se by means of heating elements which are arranged below strip 1*c* in the binding apparatus 21 (not illustrated) and first exert pressure from below to press the strip towards the spine of the sheet stack and then exert pressure laterally on the cover sheets, recesses being provided in the heating elements for receiving the holding elements 23.

When the strip is engaged by the holding elements 23 of binding apparatus 21, transport carriage 15 is returned by stepping motor 19 into the path 13 of cutting unit 12 so that during the holding or the binding operation, a new strip can be cut, as described, to the length required and made available for another binding operation. If no additional binding strips are required, the leading strip edge remains in the handling position 12' or the strips are exchanged in that a signal is generated by the central electronic unit which causes the motors 9 as well as 5 or 6 to return the strip from the strip handling position 12' to the standby position 7'.

The invention has been described in detail with particular reference to preferred embodiments thereof, but it will be understood that variations and modifications can be effected within the spirit and scope of the invention as set forth in the claims.

What is claimed is:

1. Apparatus for feeding strips coated with a fusion adhesive on one of their surfaces to a sheet-stack binding apparatus for binding loose sheets to form brochures or books, said apparatus (14) having a supply station (1*a*, 1*b*) for a plurality of fusion-adhesive coated strips of different widths (1*c*, 1*d*) of which a strip having the width required for a sheet stack to be bound can each be transferred along a path (13) by driving means (5, 6, 9) to a cutting unit (12), characterized in that in the path (13) of the strip, a transpost carriage (15) is arranged downstream of cutting unit (12) so as to be vertically movable with respect to said path, in that a horizontally movable element (16) as well as a plurality of stationary mechanical elements (11, 17) are mounted on transport carriage (15) for holding the strip free from torsion, and in that driving and control means (19) as well as tilting device (18) are provided for moving transpost carriage (15) in a vertical direction to the strip path (13), whereby such strip in the binding apparatus (21) holding a sheet stack is centrally aligned and fixed on the spine of the sheet stack by holding elements (23) of binding apparatus (21).

2. The binding strip feeding apparatus according to claim 1 wherein said transport carriage (15) and said horizontally movable element (16) are connected to separately controllable stepping motors (19, 24).

3. The binding strip feeding apparatus according to claim 2, wherein said horizontally movable element (16) is connected to said stepping motor (24) via a slip clutch.

4. The binding strip feeding apparatus according to claim 1, wherein said horizontally movable element (16) includes a gripping and pulling element and said stationary mechanical elements includes a hold-down element (17), and a switchable strip guide element (11) arranged between said horizontally movable element and said hold-down element.

5. The binding strip feeding apparatus according to claim 4, wherein said switchable strip guide element (11) has channels (11*a*, 11*b*) each adapted to one of the strip widths and adapted to be centrally moved into the strip path (13) by means of actuating magnets (11*c*).

6. The binding strip feeding apparatus according to claim 5, wherein said magnets (11*c*) of said strip guide elements (11) are actuated by signals controlling said strip driving means (5, 6) so as to provide respective strip guides of appropriate width to the particular strip being driven by said strip driving means.

* * * * *